United States Patent [19]
Romanauskas

[11] Patent Number: 4,753,630
[45] Date of Patent: Jun. 28, 1988

[54] SPEED LIMITING ARRANGEMENT FOR A CENTRIFUGE ROTOR MOUNTED FROM THE UNDERSURFACE THEREOF

[75] Inventor: William A. Romanauskas, Southbury, Conn.

[73] Assignee: E. I. Du Pont de Nemours and Company, Wilmington, Del.

[21] Appl. No.: 926,178

[22] Filed: Nov. 3, 1986

[51] Int. Cl.[4] ........................... B04B 7/06; F16D 9/00

[52] U.S. Cl. ........................... 494/9; 494/12; 494/84; 464/32

[58] Field of Search ..................... 494/7, 9, 12, 82, 83, 494/84; 464/32

[56] References Cited

U.S. PATENT DOCUMENTS

| | | | |
|---|---|---|---|
| 2,446,133 | 7/1948 | Hawthorne | 464/32 |
| 3,101,322 | 8/1963 | Stallman | 494/12 X |
| 3,961,745 | 6/1976 | Wright | 494/9 |
| 3,990,633 | 11/1976 | Stahl et al. | 494/84 |
| 4,101,070 | 7/1978 | Hoare et al. | 494/9 |
| 4,568,325 | 2/1986 | Cheng et al. | 494/84 |

*Primary Examiner*—Stuart S. Levy
*Assistant Examiner*—Katherine Matecki

[57] ABSTRACT

A centrifuge rotor is characterized by a protrusion on the undersurface thereof which is received by a conjoinable pair of collar members. Each collar has a recess therein which cooperate to receive a drive spud from the rotor drive. A prestressed arrangement exerts a compressive force of a predetermined magnitude on the collar members to hold them together. The compressive force is progressively relieved as the rotor is rotated to a predetermined speed. Thereafter, increased rotor speed imposes a centrifugal force on the prestressed arrangement to cause it to fail in tension, thereby permitting the collar members to separate and thus release the rotor from its engagement with the drive.

10 Claims, 3 Drawing Sheets

SPEED LIMITING ARRANGEMENT FOR A CENTRIFUGE ROTOR MOUNTED FROM THE UNDERSURFACE THEREOF

BACKGROUND OF THE INVENTION

The present invention relates to a speed limiting arrangement for a centrifuge rotor, and, in particular, to a speed limiting arrangement for a centrifuge rotor mounted from the undersurface thereof.

DESCRIPTION OF THE PRIOR ART

A centrifuge rotor is a relatively massive member adapted to expose a sample of a liquid to a centrifugal force field. To create the force field the rotor is rotated to a relatively high rotational speed.

All centrifuge instruments should be designed to contain all fragments resulting from the burst of any rotor designed to be used in that instrument. Rotor bursts can result from several causes: (1) manufacturing defects; (2) user abuse; (3) corrosion; (4) fatigue; or (5) failure of electronic speed limiting systems to limit the speed of the rotor to its maximum safe operating speed. In the first four causes listed rotor burst would occur at speeds at or below the maximum rated operating speed. In the case of the fifth cause, the burst would occur at a speed substantially above the maximum rated operating speed.

To guard against such failure of the electronic speed limiting systems and the consequences thereof there are known mechanical arrangements whereby the rotor may be disconnected from its source of motive energy. Exemplary of such mechanisms are those disclosed in U.S. Pat. Nos. 3,990,633 (Stahl et al.) and 4,568,325 (Cheng et al.).

Both of these devices relate to rotors that are mounted to the rotor drive from the undersurface thereof and utilize a mounting base or hub suitably attached to the rotor by an array of axially extending bolts. The base has a driving surface which matably engages with the drive spindle from the motive source. These elements form the driving interconnection between the rotor and its source. The base has reduced thickness web regions which are highly stressed as the rotor is operated. The base fractures in the highly stressed web regions if the rotor spins at too great a speed, thus disengaging the rotor from the drive.

These devices have two shortcomings in common. As described they create stress concentrations within the rotor body proper. In addition their reliability depends upon accurately predicting fracture speed of cyclically loaded members, viz., the web regions. The fatigue damage resulting from cyclical loading would cause decoupling to take place at lower speeds for older rotors and higher speeds for newer rotors. To guard against premature decoupling (before rotor design life is exceeded) it would be necessary to have a decoupling speed for new rotors higher than that needed if fatigue were not a factor. Even so, uncertainties associated with predicting fatigue failure would result in a certain amount of premature nuisance trips.

Accordingly, it would be advantageous to provide a mechanical arrangement responsive to rotor speed which is more finely sensitive to rotor speed than the prior art mechanisms and which will cause the rotor to disconnect from its driving engagement with the source of motive energy.

SUMMARY OF THE INVENTION

The present invention relates to a centrifuge rotor of the type that is mounted at its undersurface to a drive spud disposed at the upper end of a drive shaft. The shaft is part of the rotor drive system. In accordance with the present invention the rotor is provided on the undersurface thereof with a mounting protrusion having at least one but preferably two flat surfaces thereon. A first and a second mounting collar member, each have an upper and a lower cutout portion therein, are engageable and cooperable to define an upper recess shaped in conformity with the configuration of the protrusion and a lower recess that is sized and configured to mate with the drive spud. When the collar members are conjoined they simultaneously surround the protrusion to capture the same and mate with the drive spud thereby to interconnect the rotor to the drive system.

Each of the collar members preferably is provided with a planar surface which abuts against the flats on the protrusion. With the protrusion captured by the collar members the rotor is prevented both from rotating relative to the collar members and from axially displacing away from the drive. Tensilely prestressed means is provided for holding the collar members together with a compressive force of a predetermined magnitude. The compressive force is progressively relieved as the rotor is rotated to a first predetermined rotational speed. Only then does rotation of the rotor to greater speeds result in the increase in the tensile lod on the prestressed means. The holding means responds to centrifugal force imposed thereon due to the greater rotational speed to release the collar members from their engagement with each other thereby to break the interconnection of the rotor to the motive source, thus preventing the occurrence of an overspeed condition.

The holding means may take the form of one or more threaded bolts which are tensilely loaded to impose the compressive force on the collar members. Alternately, the holding means may be configured from a band of material circumferentially disposed about the collar members.

BRIEF DESCRIPTION OF THE DRAWINGS

The invention will be more fully understood from the following detailed description thereof taken in connection with the accompanying drawings which form a part of this application and in which.

DETAILED DESCRIPTION OF THE INVENTION

Figure 1:
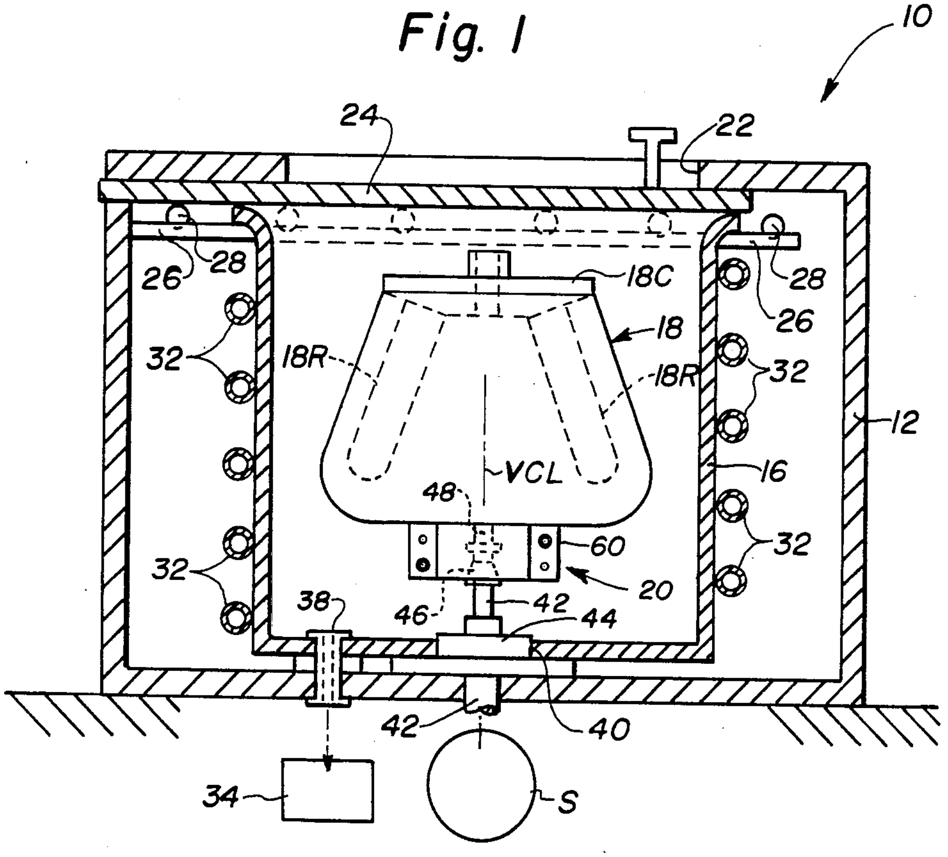
FIG. 1 is a stylized side elevational view of a centrifuge instrument with a rotor having an overspeed protection arrangement in accordance with the present invention mounted therein.

Throughout the following detailed description, similar reference numerals refer to similar elements in all figures of the drawings.

With reference to FIG. 1 shown is an ultraspeed centrifuge instrument 10 having an exterior housing 12. Disposed within the housing 12 is a chamber, or bowl, 16 which receives a rotor 18 having an overspeed control arrangement generally indicated by reference character 20. Access to the interior of the bowl 16 may be had through a central opening 22 provided in the housing 12. The opening 22 is closed by a door 24 that is movable with respect to the housing 12 in a track 26 on suitable rollers or the like 28, as is understood by those skilled in the art. A seal (not shown) may be mounted on the undersurface of the door 22 to insure the sealed integrity of the bowl 16.

If desired, the exterior of the bowl 16 may be refrigerated by the provision of a suitable array of evaporator coils 32 about the exterior of the bowl. The interior of the bowl 16 may be evacuated by a vacuum pump or the like diagrammatically indicated at 34 that communicates with the interior of the bowl 16 through a fitting 38 provide therein.

The lower boundary of the bowl 16 is provided with a central aperture 40 through which a drive spindle 42 extends centrally and axially into the bowl 16. The integrity of the bowl 16 is maintained by a vacuum seal 44 that extends between the spindle 42 and the bowl 16. The upper end of the spindle 42 is terminated by a frustoconical member known as a spud 46.

The centrifuge rotor 18 is received on the spud 46 in a manner to be described whereby motive energy from a source S may be imparted to the rotor 18 to cause the same to rotate about the vertical central axis of rotation VCL. Any suitable motive source, such as an oil turbine or an electric motor, may be used. The rotor 18 has an array of recesses 18R each of which may receive a sample of a material to be exposed to a centrifugal force field. The axes of the recesses 18R may be inclined to the vertical central axis VCL as shown in the Figures or they may be arranged generally parallel to the axis, as should be understood by those skilled in the art. A cover 18C is threadedly attachable to the rotor 18. Of course, the rotor 18 may also be implemented in swinging bucket form and remain within the contemplation of this invention.

The rotor 18 in accordance with the present invention has a mounting boss, or protrusion, 48 (best seen in FIG. 2) machined to the undersurface thereof. The mounting boss 48 has a reduced dimension portion 50 terminating in an enlarged mounting knob 52. The enlarged knob 52 may be provided in any suitable manner in accordance with the present invention. At least one but preferably a pair of antirotation surface 56A, 56B are provided on the reduced dimension portion 50 of the boss 48. The surfaces 56A, 56B are shown as planar, but any suitable configuration thereof may be used, consistent with the antirotation function to be described.

Figure 2:
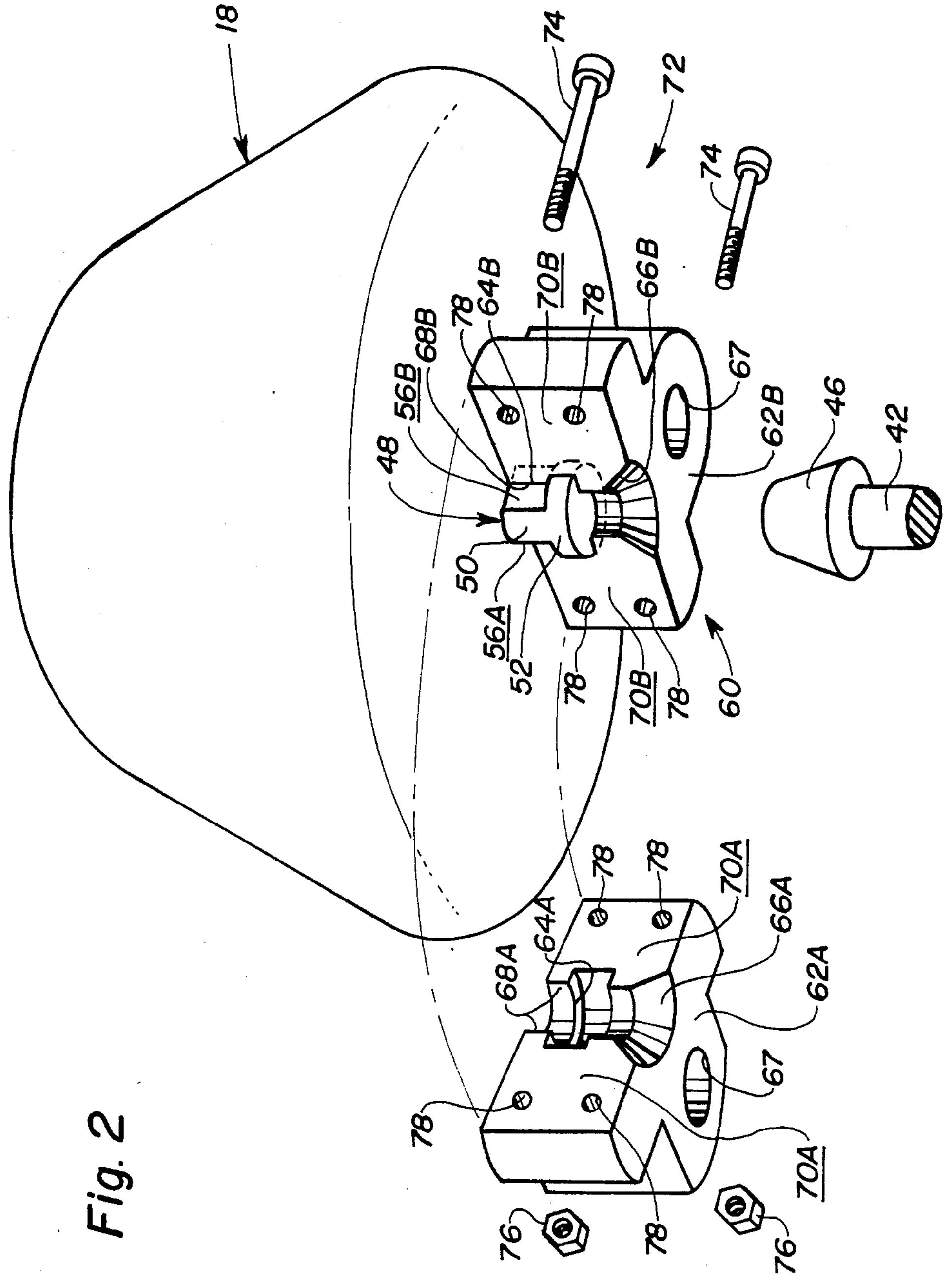
FIG. 2 is an enlarged perspective, exploded view of the undersurface of the rotor of FIG. 1 illustrating the mounting arrangement securing the rotor to its drive and the relationship of the overspeed protection arrangement in accordance with one embodiment of the invention with respect thereto.
Figure 4:
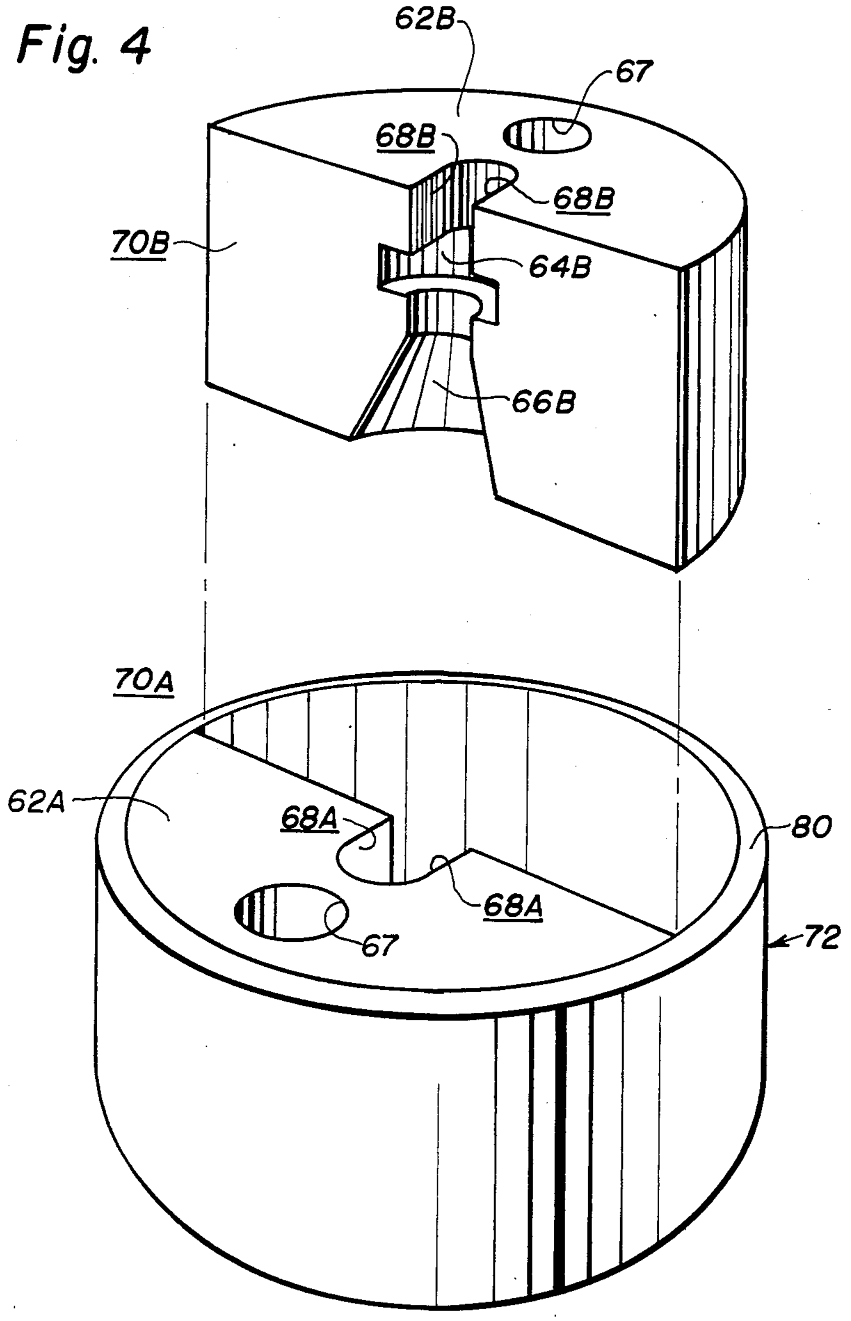

In accordance with the present invention the overspeed control arrangement 20 takes the form of a mounting adaptor 60 is attached to the boss 48 provided on the undersurface of the rotor 18. The adapter 60 is comprised of a first and second collar member 62A, 62B respectively. As is best seen in FIGS. 2 and 4 each collar member 62A, 62B. respectively, has an upper cutout portion 64A, 64B and a lower cutout portion 66A, 66B respectively formed therein. Openings 67 are provided in the collar members 62A, 62B for a purpose to be described.

The collar members 62A, 62B, when engaged, cooperate to define upper and lower recesses respectively configured to accept the boss 48 and the drive spud 46. Each of the upper cutouts 64A, 64B includes a generally planar surfaces 68A, 68B that respectively engage against the flats 56A, 56B on the boss 48. Of course, were the surfaces 56 otherwise configured the surfaces 68 would be shaped in conformity thereto.

Figure 3:
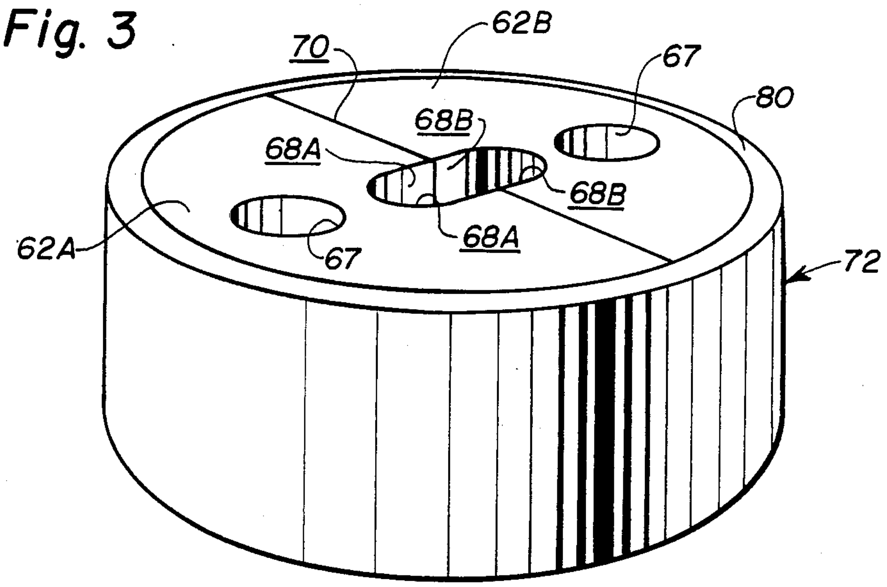
FIGS. 3 and 4 are, respectively, perspective views illustrating an alternate embodiment of the invention in an assembled and an exploded condition.

The collar members 62A, 62B are preloaded in compression along the confronting interfaces 70A, 70B thereof by a tensilely loaded prestressed means generally indicated by the reference character 72. In one embodiment of the invention best shown in FIG. 2 the tensilely prestressed means 72 takes the form of an array of bolts 74 and associated interengaged nuts 76 which extend through bores 78 provided in the collar members 62A, 62B. The bolts 74 are arranged with their axes perpendicular to the axis of rotation VCL. In an alternate embodiment shown in FIGS. 3 and 4, the prestressed means 72 takes the form of an annular band 80 which is shrunk fit about the exterior of the conjoined collar members 62A, 62B.

When conjoined the collar members 62A, 62B capture the enlarged mounting knob 52 in the upper recess 64 to prevent axial motion of the rotor 18 with respect to the mounting adapter 60. Relative rotation of the rotor 18 with respect to the adapter 60 is precluded by the abutment of the surfaces 56, 68 on the boss 48 and the adapter 60, respectively. The drive 46 spud is accepted in the lower recess 66 in the adapter 60.

The collar members 62A, 62B are loaded in compression along their interfaces 70A, 70B by the tensilely loaded prestressed means 72, by whatever form it is configured. As the rotor 18 rotates centrifugal force imposed on the collar members 62A, 62B acts first to progressively reduce the compressive preloading imposed on the collar members 62A, 62B by the prestressed means 72. When the predetermined centrifugal force corresponding to a first predetermined rotational speed is imposed on the collar members 62A, 62B sufficient to counteract the compressive preload only then does any further increase in rotational speed result in an increase in the tensile load on the prestressed means 72, whether implemented byt he band 80 or the bolts 74, as the case may be. By judiciously selecting the size of the openings 67 and the material properties and size of the prestressed means 72 the same can be caused to fail in tension at a predetermined threshold centrifugal force corresponding to a second, higher, predetermined rotor speed limit. When this speed limit is reached the bolt 74 or the band 80 fails. releasing the collar members 62A, 62B and causing them to separate, thus isolating the rotor 18 from its drive. In this way the means 72 is subjected to constant stress independent of speed up to the first predetermined rotor speed, slightly above normal operating speed, thereby preventing fatigue damage from influencing the speed at which the prestressed means fail.

Those skilled in the art having benefit of the teachings of the present invention as hereinabove set forth may effect numerous modifications thereto. For example, more than two collar members62 may be used in the adapter 60. Also, any other arrangement, such as magnetic attraction or adhesive agents, can be used to prestress the means 72. These modifications are to be construed as lying within the scope of the present invention as defined in the appended claims.

What is claimed is:

1. A centrifuge rotor rotatable about an axis of rotation comprising:

a body;

a protrusion disposed on the lower surface of the body, the protrusion having a predetermined external configuration which includes at least one planar surface;

a first and a second mounting collar member each having an upper and a lower cutout therein, the collar members being engageable to define an upper recess bounded by a flat surface over some portion thereof, the upper recess being shaped in conformity to the configuration of the protrusion the collars also defining a lower recess able to interconnect with a source of motive energy; and means for holding the collar members together in compression with a predetermined force that acts in a direction parallel to the planar surface on the protrusion, the compressive force being progressively relieved as the rotor is rotated to a first predetermined rotational speed, the holding means being responsive to centrifugal force as the rotor is rotated to a second, higher, speed to release the collar members from each other and thereby to break the interconnection of the rotor to the motive source.

2. The rotor of claim 1 wherein the holding means comprises an interengaged bolt and nut engaging both of the collar members.

3. The rotor of claim 2 wherein the protrusion has a reduced dimension portion terminating in an enlarged knob, the collar members when joined engaging the knob so as to prevent relative axial movement of the collar members with respect to the rotor.

4. The rotor of claim 1 wherein the holding means comprises a band circumferentially encompassing the collar members.

5. The rotor of claim 4 wherein the protrusion has a reduced dimension portion terminating in an enlarged knob, the collar members when joined engaging the knob so as to prevent relative axial movement of the collar members with respect to the rotor.

6. The rotor of claim 1 wherein the protrusion has a reduced dimension portion terminating in an enlarged knob, the collar members when joined engaging the knob so as to prevent relative axial movement of the collar members with respect to the rotor.

7. A centrifuge rotor rotatable about an axis of rotation comprising:

a rotor body hving a plurality of cavities therein;

a mounting protrusion disposed on the lower surface of the body, the protrusion having an external configuration that includes at least one planar surface;

a first and a second mounting collar each having an upper and a lower cutout therein, the collars being engageable to define an upper recess bounded by a flat surface over some portion thereof, the upper recess being shaped in conformity to the configuration of the protrusion, the collars also defining a lower recess interconnectable with a source of motive energy; and a first and a second bolt and nut arrangement engaging both the collars and holding them in compression with a predetermined force, the axes of the bolts both being parallel to the surface on the protrusion, the compressive force being progressively relieved as the rotor is rotated to a first predetermined rotational speed, the bolt and the nut arrangements being responsive to centrifugal force imposed therein as the rotor is rotated to a second, higher, speed to release the collars from each other and thereby to break the interconnection of the rotor tot he motive source.

8. The centrifuge rotor of claim 7 wherein the protrusion has a reduced dimension portion terminating in an enlarged knob, the collar members when joined engaging the knob so as to prevent relative axial movement of the collar members with respect to the rotor.

9. A centrifuge rotor rotatable about an axis of rotation comprising:

a rotor body having a plurality of cavities therein;

a mounting protrusion disposed on the lower surface of the body, the protrusion having an external configuration that includes at least one planar surface;

a first and a second mounting collar each having an upper and a lower cutout therein, the collars being engageable to define an upper recess bounded by a flat surface over some portion thereof, the upper recess being shaped in conformity to the configuration of the protrusion, the collars also defining a lower recess interconnectable with a source of motive energy; and a band circumferentially disposed about and encompassing both of the collars to hold them in compression with a predetermined compressive force that acts in a direction parallel to the planar surface on the protrusion, the compressive force being progressively relieved as the rotor is rotated to a first predetermined rotational speed, the bolt and the nut arrangements being responsive to centrifugal force imposed therein as the rotor is rotated to a second, higher, speed to release the collars from each other and thereby to break the interconnection of the rotor to the motive source.

10. The centrifuge rotor of claim 9 wherein the protrusion has a reduced dimension portion terminating in an enlarged knob, the collar members when joined engaging the knob so as to prevent relative axial movement of the collar members with respect to the rotor.

* * * * *